(12) United States Patent (10) Patent No.: US 7,200,420 B2
Rankin (45) Date of Patent: Apr. 3, 2007

(54) DEVICE CONTROL APPARATUS AND METHOD

(75) Inventor: Paul J. Rankin, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 926 days.

(21) Appl. No.: 09/920,039

(22) Filed: Aug. 1, 2001

(65) Prior Publication Data

US 2002/0039909 A1 Apr. 4, 2002
US 2005/0266894 A9 Dec. 1, 2005

Related U.S. Application Data

(63) Continuation of application No. 09/635,548, filed on Aug. 10, 2000, now Pat. No. 6,782,253.

(30) Foreign Application Priority Data

Oct. 4, 2000 (GB) .................................. 0024236.2

(51) Int. Cl.
H04B 1/38 (2006.01)
H04M 1/00 (2006.01)
(52) U.S. Cl. .................................... 455/558; 455/575.1
(58) Field of Classification Search ................ 455/67.1, 455/558, 575.1, 575.2, 575.3, 575.4
See application file for complete search history.

(56) References Cited

U.S. PATENT DOCUMENTS 5,404,580 A 4/1995 Simpson et al. ............... 455/89
5,814,798 A 9/1998 Zancho ........................ 235/380
6,405,019 B1 * 6/2002 Murray ...................... 455/67.11
7,092,519 B1 * 8/2006 Lindholm .................... 379/419

FOREIGN PATENT DOCUMENTS

EP 0529721 A2 3/1993
EP 0848564 A2 6/1998
EP 0865188 A2 9/1998
GB 2 362 071 * 7/2001
GB WO 01/86922 * 11/2001

* cited by examiner

Primary Examiner—William J. Deane, Jr.
(74) Attorney, Agent, or Firm—Larry Liberchuk

(57) ABSTRACT

An electronic device such as a mobile telephone is provided with a reader for reading data from a physical data carrier. Physical data carriers are incorporated into accessories of the device, for example a telephone carrying case. The act of inserting the telephone into the case causes the reader to read data from the data carrier and the data is used to implement required device settings of the electronic device. The data carrier may be a bar code, RF tag or contact tag. By providing a number of carrying cases each with its own data carrier, merely exchanging cases initiates a number of associated device settings to be selected. Each case may be associated with a particular environment or user context allowing the user to alter the behavior of the device to suit context merely by interchanging carrying case. Data carrier may also be provided in other accessories such as car-telephone kits and battery chargers to alter device behavior accordingly. Device settings include those which govern the type of information relayed to the user when the device receives information from data delivery services.

19 Claims, 2 Drawing Sheets

DEVICE CONTROL APPARATUS AND METHOD

CROSS REFERENCE TO RELATED APPLICATION

This is a continuation of prior application Ser. No. 09/635,548 filed Aug. 10, 2000, now issued as U.S. Pat. No. 6,782,253.

The present invention relates to an apparatus and method for controlling various settings of electronic devices such as portable telephones and personal digital assistants, and to such a device.

With the ever-increasing functionality of devices such as mobile telephones and personal digital assistants, there is a corresponding increase in the number of possible device and user settings that can be chosen. Various attempts to assist the user in controlling such a large number of possible device settings include arranging settings into a hierarchical menu structure through which the user is able to navigate. Use of such menus allows settings of a similar category to be grouped together and those settings which are more likely to be changed may be placed higher up the menu structure so that they can be reached more quickly.

Depending on the context of the user of the device, particular device settings may be preferred. For example, when the user of a mobile telephone is at work, the user may only be interested in receiving incoming calls that are work related, in which case incoming calls which are not work related should not cause an incoming call alert signal to be generated and/or such calls may be re-directed to a message answering service. In those instances where a call is indeed work related but the user is in a meeting, it is often desirable that the incoming call alert signal should be of a type that will not disturb other people present in the meeting. In such an example it may be desirable to set the incoming call alert signal to be a visual alert or vibrating alert in preference to the more traditional audible alert.

It will be apparent that for a given user context, a particular device setting will normally be favoured each time a user finds themselves in that context. Furthermore, it will be appreciated that sometimes a particular group of such device settings will be favoured each time a user finds themselves in that context.

In order to assist a user of a mobile telephone device with the task of configuring the device for use in a particular environment, it is known to provide the device with a feature allowing the user to change incoming call alert type device settings by selecting options that are labelled by reference to environment, such as 'meeting' or 'outside'. Making the selection 'outside' may, for example, cause the incoming call alert to be an audible alert tone generated at one of the devices higher volume settings. Typically, the user is assisted in the task of making such selections by providing a way to access the list of available options in a relatively straightforward way, for example by use of a dedicated key press sequence or by not burying the options deep within a cascading menu structure. While this approach of altering certain device settings goes some way to assisting a user in the task of changing the way that their device operates, there is still the requirement for a user to navigate a user interface and make the required settings each time they wish to configure the device for a particular environment.

It is an object of the present invention to provide a way of controlling one or more setting of an electronic device, such as mobile telecommunications equipment, which is easy for the user to understand and to carry out.

In accordance with a first aspect of the present invention there is provided an apparatus for implementing at least one operational setting of an interactive electronic device, said apparatus comprising:

reading means for reading information from a physical data carrier;

processing means for receiving the information read from the carrier by the reading means and interpreting said read information; and control means responsive to said processing means for implementing the at least one operational setting.

Thus by presenting the physical data carrier to the reading means, the apparatus serves to implement the at least one operational setting of the device without the user needing to perform the usual sequence of navigating a device graphical user interface or the like each time such settings need to be made. By including the reading means in the device itself, the at least one operational setting can be made by presenting the physical data carrier to the device.

The information carried in the data carrier may be data that specifies the at least one required device setting itself.

The information carried in the data carrier may be data carrier identity information. In this case the apparatus may further comprise association means for associating said data carrier identity information with an at least one of the required device settings, wherein receipt of said carrier identity information by the processing means initiates implementation of the said at least one of the device settings. The association means may include storage means for holding data linking each data carrier identity with at least one corresponding device setting. The storage means may be provided in the interactive electronic device.

The physical data carrier may be provided in the form of a radio frequency identification (RFID) tag and said reading means is configured for interrogating such tags. Where the device already includes radio transmission and reception equipment, for example in the case of 'mobile' telecommunications equipment, the existing radio transmission and reception equipment may also serve as the reading means.

The physical data carrier may include a graphical tag having a graphical pattern such as a bar code carrying the information in which case the reading means is configured for reading such graphical tags.

The physical data carrier may be provided in the form of a contact tag and said reading means is configured for reading information from such tags.

The physical data carrier may be provided in an accessory usable with the interactive electronic device.

The physical data carrier may be provided in items such as a cover or a pouch suitable for accommodating the interactive electronic device. Therefore by having a particular cover or pouch representing one user context, placing the device such as mobile telecommunications equipment or other such devices into the pouch will cause the physical data carrier to be read by the reader located in the device which causes the device to adopt the operational settings appropriate for the context which is represented by the particular pouch. The physical data carriers can be included in other equipment such as a device power supply, in a device battery charging apparatus, in a device accessibility option arrangement such as a hands-free telephone kit or car telephone conversion kit, or carried by the users clothing. Therefore, merely by presenting a device benefiting from the apparatus of the present invention to such pieces of equipment carrying the physical data carrier it is possible to change operational settings such as incoming telephone call user alert settings, graphical user interface (GUI) settings, voice dial options, message reproduction settings, telephone usage access permissions and telephone user directory settings and entries, in such a way that the settings are appropriate for the user context.

Where the device is one that is capable of receiving data from a push-type data distribution service, the apparatus of the present invention may be used to select settings that govern which received information is to be processed. For example the apparatus may be used to select settings of the device which relate to filter options for incoming information made available in a push-type data distribution service, in order to regulate the information that is presented to the user.

In accordance with a second aspect of the present invention there is provided a physical data carrier suitable for use with the apparatus of the present invention, said data carrier carrying information responsive to which said at least one operational setting of the apparatus is implemented.

In accordance with a third aspect of the present invention there is provided an interactive electronic device accessory incorporating a physical data carrier suitable for use with the apparatus of the present invention, said data carrier carrying information responsive to which said at least one operational setting of the apparatus is implemented.

In accordance with a fourth aspect of the present invention there is provided a system incorporating the apparatus of the present invention and the physical data carrier of the present invention.

In accordance with a fifth aspect of the present invention there is provided an interactive electronic device having at least one setting implemented by apparatus, said apparatus comprising:

reading means for reading information from a physical data carrier;

processing means for receiving the information read from the carrier by the reading means and interpreting said read information; and control means responsive to said processing means for implementing the at least one operational setting. Optionally part of said apparatus may be integrated with the electronic device.

In accordance with a sixth aspect of the present invention there is provided a method of implementing at least one operational setting of an interactive electronic device, said method comprising the steps of:

reading information from a physical data carrier;

processing the information read from the physical data carrier to interpret said read information; and implementing the at least one operational setting of the interactive electronic device in response to the interpreted information.

The method may further comprise the step of writing information to the physical data carrier, the information serving to associate said physical data carrier with at least one operational setting of the interactive electronic device.

These and other aspects and optional features appear in the appended claims, to which reference should now be made and the disclosure of which is incorporated herein by reference.

Embodiments of the present invention will now be described by way of example only with reference to the accompanying drawings in which.

Figure 1:
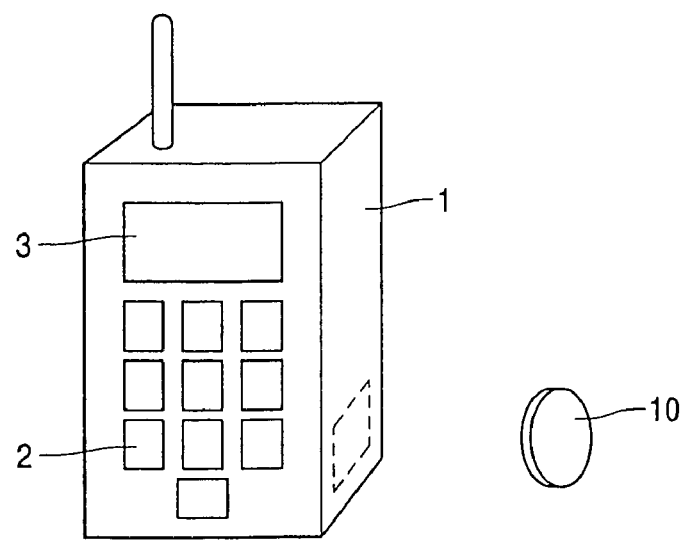
FIG. 1 shows an interactive electronic device provided with the apparatus of the present invention.

With reference to FIG. 1, an interactive electronic device 1 is provided in the form of mobile telecommunications equipment (mobile telephone) having a user keypad 2 and user display 3. A user is able to operate the mobile telephone through entering instructions with the keypad 2 and information about the current status of the telephone is provided by display 3. The mobile telephone typically provides telecommunication functions such as initiation and reception of telephone calls, use of a call answering service, text messaging, e-mail and perhaps access to other information via the wireless applications protocol (WAP) or other suitable protocols, all of which will be apparent to the person skilled in the art. The device may be provided with further communication capabilities in the form of infrared data links or links established using the so-called Bluetooth protocol. The device may also feature an electronic calendar, diary and even one or more user game, as will also be appreciated by the person skilled in the art.

The interactive electronic device 1, such as the mobile telephone, typically allows the user to change device settings which govern the way in which the device operates. An example is where the user is able to change the type of alert used to indicate the occurrence of an incoming telephone call. In some cases the choice of alert may be governed by nothing more than a user preference, an example being where the user favours one audible alert tone over another. In other cases however, a setting may be made with the user taking into account other factors such as the actual or anticipated user environment. For example, if the user is located outside in a relatively noisy environment the user may set the mobile telephone to indicate the presence of an incoming telephone call by producing an audible alert at one of the higher available device volume settings. On the other hand, if the user is in a meeting, the user may set the mobile telephone to indicate the presence of an incoming telephone call by producing a visual alert or through causing the telephone to vibrate. Each of these latter indications is favoured because they are likely to be less disruptive to other people present in the meeting. Clearly the user is making device settings depending on the environment or context that the user is in or in which the user expects to find themselves.

For a given context a number of device settings may be favoured. A user may control these settings by the traditional method of navigating a menu system presented on the device display 3 by operating the user keypad 2. Since the settings may be located in different menus of a structured menu system a user will often be required to perform several key presses in order to reach the menu where the setting is located and then to actually change the setting using more key presses. Where several settings are to be changed a user will need to perform further key presses. The whole process can become laborious especially where context is changed often.

To address this problem, the interactive electronic device 1 is provided with apparatus 20 allowing device and user settings to be changed without the need to interact with the menu structure each time settings need to be made, although settings can still be changed by use of the keypad 2 and display 3 if so desired by the user. The apparatus 20 includes a reader 21 for reading information carried by one or more physical data carrier 10. In this embodiment the physical data carrier is provided in the form of a tag. Presenting a physical data tag 10 to a reader 21 allows data to be read from the tag 10, which data is used to change or implement one or more setting of the electronic device (telephone) 1.

Figure 2:
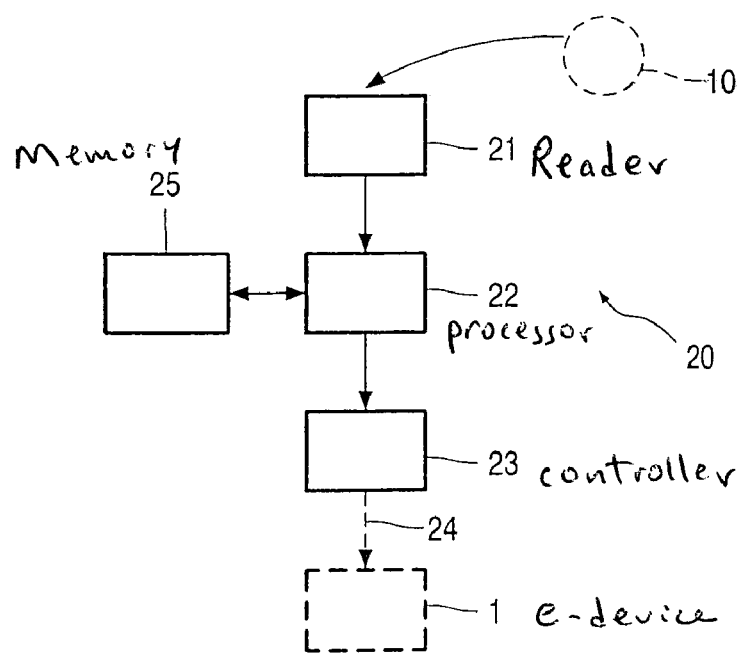
FIG. 2 represents the functional component parts of the apparatus of the present invention.

FIG. 2 represents the functional elements of the apparatus 20 for reading information from the physical tags and causing selection of the required device settings. The apparatus 20 includes a reader 21, processing means 22 and control means 23. Data is read from the physical data carrier 10 by reader 21 and this data is provided to the processing means 22. The processing means 22 interprets the data to establish which, if any, device settings need to be made. Once this has been done, the processing means 22 instructs the control means 23 to implement necessary device settings, with output control signals 24 being provided to the device 1.

The apparatus 20 may be provided wholly or partially inside the electronic device 1 since it is possible to perform certain functions, such as processing, remote from the device to be controlled. In most cases the reader 21 will be provided as an integral part of the device 1.

The data carried by the tag 10 can be data including one or more of the device settings itself, for example 'select ringer volume level 10'. In this particular case it is merely necessary for the processing means 22 to receive this data and provide the appropriate instructions to the control means 23 necessary to implement the device settings.

In another arrangement the data carried by the tag 10 may be merely data that serves to identify the tag. In this case there is also provided means for establishing an association between the particular tag identity and one or more required device settings. In use the reader 21 reads data carried by the tag 10 and provides the data to the processing means 22. Now the processing means 22 takes the data, in this case tag identity data and interrogates storage means 25 which holds information linking tag identity data with one or more device setting to establish which device settings are associated with a particular tag identity. The results from the interrogation process are used by the processing means 22 to establish those device settings associated with a particular tag identity and which should therefore be selected or implemented and the processing means 22 provides the appropriate instructions to the control means 23. The control means 23 then implements the necessary device settings by providing output control signals 24 to the device 1. Optionally, the processing means 22 and control means 23 may be regarded as discrete entities or discrete functional elements. However, the processing means 22 and control means 23 may generally be implemented by the same data processing device.

The storage means 25 of the apparatus may be provided with the other parts of apparatus or provided remote from the apparatus. In the latter case it is possible for the necessary tag and device setting associations to be held remotely in a storage means which may be hosted by a service provider or third party. Through this approach a service provider is able to make available a selection of chosen device settings appropriate for a given context. Multiple instances of such selections may be made available, each instance being suitable for a given context. The user can easily access such selections for implementing changes in their own device.

The associations may be held in a look-up table or provided in other ways as will be apparent to the person skilled in the art.

Figure 3:
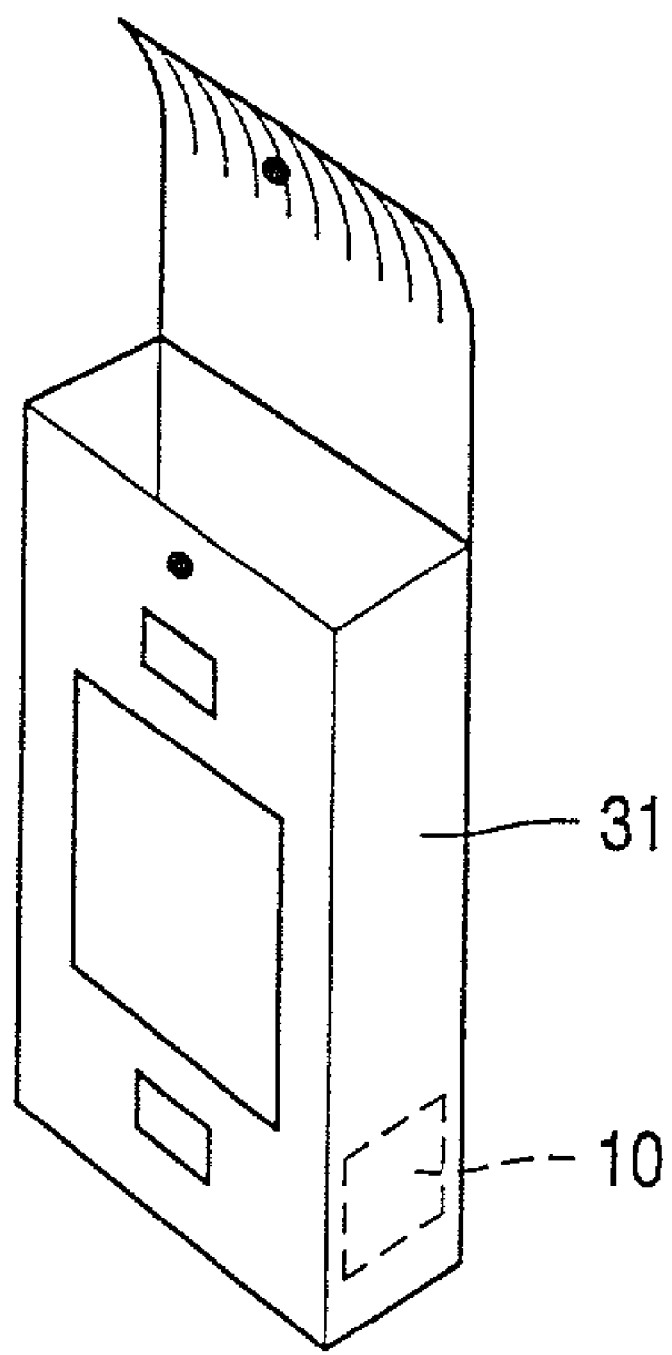
FIG. 3 shows a case suitable for carrying an interactive electronic device, the case being provided with a physical data carrier configured for operation in accordance with the present invention.

With reference to FIG. 3, data tags 10 are provided in a mobile phone carrier or pouch 31. The tags are arranged in the pouch with a position such that the tag is presented to the device tag reader 21 when the (device) mobile telephone 1 is located inside the pouch 31. By making a particular tag resident in a particular pouch, then the action of placing the phone into that pouch will cause the phone to adopt all settings associated with the tag of that pouch, through processes which have already been explained above. Hence the user is able to associate a particular pouch with a particular set of device settings, and the associated context.

A user may posses a number of pouches each with its own tag. In this case the user is able to configure their equipment such that putting the phone in a first pouch causes the telephone to adopt a number of device settings appropriate for the workplace for example, putting the telephone in a second pouch causes the phone to adopt a number of device settings appropriate for commuting for example, while putting the telephone in a third pouch causes the phone to adopt a number of device settings appropriate for a social environment and so forth. It is known to provide mobile telephone equipment with detachable or interchangeable covers allowing the colour and general look of the telephone to be changed simply by selecting a different cover. Generally a user will select a particular casing portion due to user preference, with consideration to the environment they expect to be found in or both. Thus a user might select a cover that presents a look suited to their environment, such as a look that represents fun, sophistication, practicability and so on. Likewise, the user may now select a pouch for similar sorts or reasons, with the pouch incorporating a physical data carrier. However, the act of selecting a pouch will not only cause the telephone to adopt a look suitable for a given environment, but will also cause device settings of the telephone to be altered to be appropriate for that environment. Where all of the pouches have a similar appearance, a number of pouches may still be used in order to implement device settings associated with the tag of the individual pouches. It would also be possible to provide the tags in covers of the type discussed above. Indeed, it is possible to provide tags in any interchangeable device components or optional device accessories.

Thus, the concept may be extended to other device accessories, for example a hands-free car telephone kit. Normally such kits include a cradle or the like for accommodating the mobile telephone and providing various connections necessary for hands free operation. By including a tag 10 in the cradle, the reader 21 would receive information from the tag which alters device settings suitable for hands free in car telephone operation. Such settings may govern enablement of voice dialling operations, audible incoming call alerts rather than visual alerts, audible reproduction of text messages or received e-mail messages in preference to presentation on the telephone display 3 and so on. Preferred settings also exist for other accessories such as user headset kits and battery charging apparatus.

Returning to the idea of providing a number of phone pouches, each with its own tag for causing selection of a particular group of device settings, one issue that may arise is that a user may encounter more than one context throughout the day, each requiring a particular set of device settings, in which case it would appear necessary for the user to carry a number of phone pouches around—one for each expected context. This will not always be a convenient option so in an alternative arrangement a mobile phone pouch is provided with more than one tag, each being read by the tag reader 21 under control of the user. This may be done in a number of ways such as providing the pouch with a movable disc carrying two or more tags, allowing the user to rotate the disc and cause a chosen tag to be presented to the tag reader for initiating a selection of particular associated device settings. In another arrangement a user may be able to selectively enable or disable each of a number of tags provided on the telephone pouch. In yet another arrangement the user may carry around a separate bunch of tags and present any one of the tags to the telephone reader in order to initiate a selection of particular associated device settings. In another arrangement a number of tags are attached to the pouch, and the user can choose to present different tags into the tag reader at will. A similar approach may be adopted in reducing the number of covers, interchangeable device components and accessories that need to be carried by the user.

The electronic device may periodically check for the presence of tags in the vicinity of the tag reader and the frequency at which this is done will be governed at least in part by an acceptable trade off between how often the check is required and the demands that each event of checking puts on the power supply. In order to avoid unnecessary tag reading events, a user may initiate a tag reading event themselves when they know that a tag is in the vicinity of the reader or that a different tag has recently been placed in the vicinity of the reader. Such initiation may be enabled by appropriate operation of the keypad 3. Tag reading may also be triggered by other events such as when the telephone is initially switched on or when the telephone is connected to an accessory. Pouches and/or the device 1 may be provided with micro switches or other suitable sensors in order to detect when a device has been placed in the pouch.

The physical data carrier (tag) and data carrier reader (tag reader) may take a number of possible forms, some of which will now be described. Other forms of tag and reader may also be used without departing from the scope of the present invention as will be appreciated by the person skilled in the art.

A first example is to provide a physical data carrier in the form of a graphical code such as a bar code printed on a substrate and to provide a data carrier reader in the form of a graphical code reader, such as a bar code reader. Bar codes and readers are now commonplace items. The cost of providing the bar codes themselves is very low and so the inclusion of such codes on device accessories such as carrying pouches would be extremely low. Bar codes are however fixed. Where the bar codes carry only information to distinguish that bar code from others, the user merely needs to program the device association means to ensure that when that particular bar code is read by the reader, the required device settings are implemented. The fact that the bar code cannot be altered is not an issue as long as the device setting associations for a given bar code can be tailored to the requirements of the user. In the instance where device accessories are those of the type carrying physical data carriers bearing bar codes, it will be necessary to provide each accessory with a selection of different bar codes for use with/attachment to the accessory to avoid the situation where a user owns more than one accessory bearing the same bar code (except where this occurs through user choice). Bar codes carrying explicit device setting parameters may also be employed although such a scheme will require a large number of bar codes if flexibility is to be maintained.

Recent advances in personal computing technology have brought about the possibility of individuals printing their own bar codes. While this avoids a user being restricted to using any pre-printed bar codes supplied with the accessory, it also provides a way for an individual to produce bar codes of the type which may carry information specifying one or more device setting explicitly, rather than the need to rely on data associating a bar code identity with one or more device setting as described in the previous paragraph.

Another type of suitable physical data carrier is a radio frequency transponder. In general, a transponder is a device that will transmit a signal in response to receiving an interrogation signal. The transponders are interrogated by a reader which sends an interrogation signal and receives a response transmitted by the transponder. The information transmitted by the transponder can include an identity and/or data code, depending on the type of transponder used. The signals are often carried in the form of magnetic, electrical, or electromagnetic propagation. Transponders are commonly known as 'tags' and tags generally fall into three categories; inductive tags, back scatter tags and two-way tags.

Yet another type of physical data carrier technology is the contact-type tag which relies upon electrical contact being made between the tag and the reader. An example of such a tag is the iButton™ available from Dallas Semiconductors. Typically the tags comprise of circuitry (hereinafter a 'chip') provided in a small button-like casing, although the chips are available separately for building into an alternative casing of the users choice. The chips are provided with a unique identity and include non-volatile re-writable storage. Each chip can be read by establishing just two electrical contacts between the reader and chip. By making contact between the chip and reader, the chip is provided with power from the reader and information is read from the chip via the same contacts. The time required to read the identity of the chip is typically a few milliseconds so momentary contact between the chip (tag) and reader will be sufficient to provide correct operation in accordance with the present invention. The occurrence of the tag being placed in a reader can be detected through the tag drawing power. The initial drawing of power, as occurs when the tag is placed in the reader can be used to trigger reading of the tag, thereby obviating the need to periodically activate the reader merely to check if a tag is placed in the reader, as is the case with a bar code and RF tag types. Therefore use of contact type tag technologies can result in lower overall power consumption in comparison with other tag technologies which can be useful in mobile applications having exhaustible power supplies. Contact type technologies are also low cost and the tags lend themselves to being included in interchangeable accessories. Furthermore the tag readers can be made at low cost since they merely require a suitable electrical contact arrangement. For in the case of those device chipsets having a serial I/O capability, the cost of interfacing the tag reader contacts with the chipsets is also very low because the additional components required may amount to little more than a resistor.

The physical form of the contact tag reader depends on the physical form of the contact tags themselves, and any suitable contact arrangement capable of establishing at least momentary contact between tag and reader may be used. Bearing in mind that the chips may be embedded into whatever design of tag the user prefers, the number of possibilities as far as physical tag and tag reader design is concerned is large.

Other types of tag technology that could possibly be employed include magnetic loop tags, such as tags relying on passive read-only magnetically-coupled inductive loops which have individual characteristic resonant frequencies. These are low-cost and commonly available. The flat loop coils may be around 15 mm by 15 mm in size although the Holotag LFM HT12 tags have coils which are 10 mm in diameter and 1 mm thick and are available to provide hundreds of different tag identities.

Alternative data carrier technology suitable for use with the present invention includes chip cards, magnetic stripes and so forth. In most cases it is preferable that the tags are robust, washable and may be encapsulated where necessary in plastic.

The present invention may be used in conjunction with additional subject matter from pending U.S. patent application Ser. No. 09/635,548 filed in the name of Philips Electronics North America Corporation on Aug. 10, 2000, the teaching of which is incorporated herein by reference and from which the present application claims priority. That application describes a method and apparatus for offering services to users of electronic equipment, especially to services for users of mobile devices such as mobile phones. The mobile communication device receives a short-range wireless facilitation signal which is transmitted by nearby beacons. The facilitation signal initiates association of the facilitation signal with a service. However, the user is not always alerted to the availability of such services but is conditionally alerted depending on a presently selected user profile, or context. If the service associated with the facilitation signal matches a service of the presently selected user-profile, the user gets alerted to the service via the device, for example, by a text message generated on a display of the communication device. If the service does not match one of those specified in the profile, the user does not get alerted. The user profile may be programmable and a number of profiles may be created—the user selecting the required profile depending on their present environment. For example, the user can specify a context which includes the enablement of a shopping mode—facilitation signals that are associated with a shopping activity thus cause the user to be alerted of certain nearby goods. In this case, however, the settings of the device may be used to govern which available services are brought to the attention of the user, as well as governing the behaviour of the device itself, such as the type of alert tones employed.

We now consider a scenario where a user is provided with the above described arrangement of a device benefiting from the services described in U.S. patent application Ser. No. 09/635,548 and the present invention. A user leaves for work in the morning and chooses to travel by train. Prior to departing the user has put their mobile communications device (mobile telephone) into a rugged protective pouch which is fitted with a tag carrying an identity corresponding to the context 'commute'. At an earlier time the user has performed the task of selecting a number of device settings appropriate for commuting such as having incoming telephone calls trigger a low level audible alert and causing the telephone to vibrate. The user has also performed the task of indicating those service categories in which they will be interested when travelling. An example of such a service would be the broadcast of local travel news or general daily news information, which information may be delivered by means readable by the device. Therefore, as the user enters the railway station and such information becomes available, as indicated by facilitation signals from short-range beacons, the communications device will bring the availability of the information to the users attention, as well as the information itself. Any other information which is available but not falling into a category or categories of interest in accordance with the currently selected profile will not be brought to the attention of the user. All of these device and user settings are implemented merely through the single act of placing the communications device in the rugged protective pouch which initiates the communications device to read the data carrier located in the pouch that happens to carry an identity causing the selection of the context 'commute' and associated device settings.

Now assume that the user has arrived at the workplace. The user is no longer interested in up to date travel news and is more interested in current events in the financial market. The user removes the communications device from the rugged carrying case and places it into a lightweight pouch having a more formal appearance. The lightweight pouch also has a physical data carrier fitted but of a different identity which corresponds to a 'work' context. Once again, at an earlier time the user has performed the task of selecting a number of device settings appropriate for the workplace such as having incoming telephone calls trigger a very low level audible alert accompanied by a visual alert in the form of a flashing light. The user has also performed the task of indicating one or more service category of interest—in this case the financial marketplace. Now the communications device will bring to the attention of the user the availability of financial market information, as well as the information itself. As before, any other information which is available but not falling into the category or categories of interest specified in accordance with the currently selected profile will not be brought to the attention of the user.

Finally, consider the situation of the user after work in a social setting. Now the user is interested in the latest football scores and wants everyone else in the room to be aware that he has a mobile telecommunications device. In this case the user places the mobile telecommunications device into a bright yellow carrying case which is suitable for mounting on a belt. The bright yellow carrying case is also fitted with a physical data carrier but this data carrier has a different identity which corresponds to the context 'social'. At an earlier time the user has performed the task of selecting a number of device settings he chooses to consider appropriate for this context such as having incoming telephone calls trigger an audible alert at the highest available volume level. The user has also performed the task of indicating those service categories of interest in the 'social' context, in this case those services relating to football scores. The user has also indicated other services of interest and throughout the evening receives appropriate information, for example information drawing their attention to the availability of drinks at promotional prices in a nearby bar for the next half hour. Once again, all of these settings are implemented merely through the single act of placing the communications device in the bright yellow pouch which initiates the communications device to read the data carrier located in the pouch that happens to carry an identity causing the selection of the context 'social' and associated device settings.

While the present invention has been primarily described for use with an electronic device in the form of mobile telecommunication equipment, this in not to be construed as a limitation and the equipment may take the form of other electronic devices such as pagers, personal digital assistants (PDA's), wearable computing equipment, Global Positioning System (GPS) data receiver and so forth. While contexts and profiles are described as determining preferred device settings, other parameters which may be more often thought of as personal settings, for example address book entries and WAP browser bookmarks may be selected depending on the context or profile presently chosen. The phone jacket (or other device accessory) may be provided with a wired interface to the device, which would allow the accessory to carry a SIM card or the like containing tables indicating preferred device settings and push-technology service filtering/configuration information. An example of a wired interface is a serial interface.

The settings may be stored in memory of the device or in removable storage such as SIM cards. The settings appropriate for a given user profile or context may be modifiable on the device itself—via the user interface. The settings may be modifiable or downloaded from a computer. In any case, although the changes may be triggered at the device, the actual settings may be completely or partly stored and manipulated on a central database or server.

Certain types of physical data carriers may be programmed to alter at least some of the data stored therein. Indeed the carriers may contain fixed data such as a unique identity and also data that may be written to the device, such as further identity information or other data suitable for governing the operation of the electronic device.

The physical data carriers may be carried on or in any suitable feature such as removable covers, pouches/jackets, antennas, batteries or device accessories. Each of these may be identified by the user with the aid of colour, texture, shape, design, text or graphics to quickly allow the user to associate the given item to be associated with a profile or set of user preferences. The data carriers may store the actual settings and/or merely carry an identity causing implementation of settings through a process of associating the identity with the particular settings to be implemented.

Indeed, the physical data carriers may be carried on or in other items. For example a bag maybe provided with a physical data carrier, so that when an electronic device is placed in the bag, the device reads the data carrier and adopts particular settings. Furthermore, conference areas or conference desks may be provided with data carriers so that when the electronic device is in the conference area or placed on the conference desk, the device reads the data carrier and adopts particular settings.

Physical data carriers may also be provided in garments, such as in a pocket of a garment, so that when the electronic device is placed in the pocket, the device reads the data carrier and adopts particular settings. By providing a number of such pockets in a garment, with each pocket having a data carrier to invoke particular device settings, each pocket may correspond to a particular user context. In one example, placing the device in a certain pocket indicates that the user is busy and so should not be interrupted. It will be noted that the present invention often allows for appropriate settings of a device to be selected through natural actions of a user. For example, placing a device in a bag provided with a physical data carrier could cause the volume of an incoming call audible alert tone to be increased automatically. Similarly, placing the device on a conference room desk provided with a physical data carrier could cause an incoming call audible alert tone to be reduced in volume or disabled. In this way, device settings are selected that are appropriate to the context through natural actions of a user.

From reading the present disclosure, other modifications will be apparent to persons skilled in the art. Such modifications may involve other features which are already known in the design, manufacture and use of systems and devices and component parts thereof and which may be used instead of or in addition to features already described herein.

The invention claimed is:

1. Apparatus for implementing at least one operational setting of an interactive electronic device, said apparatus comprising:
   reading means for reading information form a physical data carrier;
   processing means for receiving the information read from the carrier by the reading means and interpreting said read information; and
   control means responsive to said processing means for implementing the at least one operational setting;
   wherein the physical data carrier is incorporated in an accessory usable with the interactive electronic device, such that the physical data carrier communicates with the interactive electronic device over a wireless medium.

2. The apparatus of claim 1 wherein said information includes data specifying the at least one required device setting.

3. The apparatus of claim 1 wherein said information includes data carrier identity information.

4. The apparatus of claim 3, further comprising association means for associating said data carrier identity information with an at least one of the required device settings, wherein receipt of said carrier identity information by the processing means initiates implementation of the said at least one of the device settings.

5. The apparatus of claim 4 wherein said association means includes storage means for holding data linking each data carrier identity with at least one corresponding device setting.

6. The apparatus of claim 5 wherein said storage means is provided in the interactive electronic device.

7. The apparatus of claim 1 wherein said physical data carrier is a radio frequency identification (RFID) tag and said reading means is configured for interrogating such tags.

8. The apparatus of claim 1 wherein said physical data carrier bears a graphical pattern carrying information and said reading means is configured for reading the patterns.

9. The apparatus of claim 1 wherein said physical data carrier is provided in the form of a tag and said reading means is configured for reading information from such tags.

10. The apparatus of claim 1 wherein the apparatus is configured to select settings of the device which include incoming telephone call user alert settings, graphical user interface (GUI) settings, voice dial options, message reproduction settings, telephone usage access permissions and telephone user directory settings and entries.

11. The apparatus of claim 1 wherein the apparatus is configured to select settings of the device which include setting of filter options for incoming information made available in a push-type data distribution service.

12. The apparatus of claim 1, further comprising writing means for writing information to the physical data carrier, said information serving to associate said physical data carrier with at least one operational setting of the interactive electronic device.

13. The apparatus of claim 1 wherein said interactive electronic device is a telecommunications device, personal digital assistant (PDA), Global Positioning System (GPS) data receiver or computer.

14. A physical data crier suitable for use with the apparatus of claim 1 and carrying information responsive to which said at least one operational setting of the apparatus is implemented.

15. An interactive electronic device accessory incorporating a physical data carrier suitable for use with the apparatus of claim 1, said data carder carrying information responsive to which said at least one operational setting of the apparatus is implemented.

16. A system incorporating the apparatus of claim 1 and the physical data carrier of claim 14.

17. The apparatus of claim 1, wherein the physical data carrier is incorporated in a) a pouch suitable for accommodating the interactive electronic device; b) in a device power supply; c) in a device battery charging apparatus, or d) in clothing carried by users.

18. A method of implementing at least one operational setting of an interactive electronic device, said method comprising:

reading information from a physical data carrier;

processing the information read from the physical data carrier to interpret said read information; and implementing the at least one operational setting of the interactive electronic device in response to the interpreted information;

wherein the physical data carrier is incorporated in an accessory usable with a the interactive electronic device, such that the physical data carrier communicates with the interactive electronic device over a wireless medium.

19. The method of claim 18, further including writing information to a physical data carrier, said information serving to associate said physical data carrier with at least one operational setting of the interactive electronic device.

* * * * *